US00RE44852E

(19) United States
(12) Reissued Patent
Yang

(10) Patent Number: US RE44,852 E
(45) Date of Reissued Patent: Apr. 22, 2014

(54) ENERGY STORAGE TYPE OF DUAL-DRIVE COUPLED POWER DISTRIBUTION SYSTEM

(76) Inventor: Tai-Her Yang, Dzan Hwa (TW)

(21) Appl. No.: 12/801,429

(22) Filed: Jun. 8, 2010

Related U.S. Patent Documents

Reissue of:
(64) Patent No.: 7,559,397
Issued: Jul. 14, 2009
Appl. No.: 11/202,238
Filed: Aug. 12, 2005

(51) Int. Cl.
*B60K 17/354* (2006.01)
*B60K 1/04* (2006.01)

(52) U.S. Cl.
USPC ..... 180/242; 180/247; 180/245; 180/65.275; 180/65.31

(58) Field of Classification Search
None
See application file for complete search history.

(56) References Cited

U.S. PATENT DOCUMENTS 6,401,854 B2 * 6/2002 Yano et al. ..... 180/242
6,464,608 B2 * 10/2002 Bowen et al. ..... 475/5
6,945,347 B2 * 9/2005 Matsuno ..... 180/242
2001/0042649 A1 * 11/2001 Maeda et al. ..... 180/65.4
2005/0284683 A1 * 12/2005 Matsuda ..... 180/242
2006/0266569 A1 * 11/2006 Fujiwara et al. ..... 180/65.2

* cited by examiner

*Primary Examiner* — Joseph M Rocca
*Assistant Examiner* — Marlon Arce
(74) *Attorney, Agent, or Firm* — Rabin & Berdo, P.C.

(57) ABSTRACT

An energy storage type of dual-drive coupled power distribution system adapted to an all wheel driving (AWD) transportation means having a revolution output end from an internal combustion engine that drives front-end load through a front-end transmission by means of an intermediate transmission providing gear-changing or clutching function and a control interface or coupling device; and to couple to revolution input end of a dual-drive type of electromagnetic coupling device, further to drive rear-end load through the other revolution output end of the dual-drive type of electromagnetic coupling drive device made in the construction of a revolving dual-end shaft with both end shafts respectively incorporated to a revolving magnetic filed structure and a revolving rotor structure to regulate the power distribution between the front-end and the rear-end loads while being subject to the manipulation by a control device.

18 Claims, 2 Drawing Sheets

ENERGY STORAGE TYPE OF DUAL-DRIVE COUPLED POWER DISTRIBUTION SYSTEM

Matter enclosed in heavy brackets [ ] appears in the original patent but forms no part of this reissue specification; matter printed in italics indicates the additions made by reissue.

BACKGROUND OF THE INVENTION (a) Field of the Invention

The present invention is related to an energy storage type of dual-drive coupled power distribution system, and more particularly to one that provides real time power distribution of for the kinetics to drive front-end load and rear-end load by an All Wheel Driving carrier for promoting drivability and drive safety under severe road and weather conditions.

(b) Description of the Prior Art

Conventional all wheel driving (AWD) is generally referred to four wheel driving, respectively two front wheels and two rear wheels; two front and one rear, or one front wheel and two rear wheels driving; or six-, even up to eight-wheel driving with additional rear wheels. Currently AWD is roughly classified into two systems:

(1) Full Time Driving: the engine power drives both of the front and the rear wheels in full time, and an additional differential damper such as the VW's SYNCRO is each disposed between the power source and the motive power side, as well as the power source and the rear wheel set. The advantages of this pattern include that both of the front and the rear wheels are given driving power and good driving performance while flaws including greater power loss and higher fuel consumption are observed.

(2) Real Time Driving: in this pattern, a controllable clutch subject to mechanical, electromagnetic, or fluid force is disposed between the rear wheels and the power source; when driving warrants, the clutch is closed up through the control by manual or automatic detection to drive the rear wheels, otherwise the front-drive takes over in case of general road conditions to save fuel consumption. However, this pattern, either in manual or automatic control mode, an immediate response is prevented when the road condition warrants since there is a slight delay in the timing for the rear wheels to generate kinetics.

(3) Alternatively, an intermediate differential wheel set is provided between the front and the rear wheels; however, the flaw of this pattern is that either differential output end skids, the other differential output end loses its power. That is, if the front wheel skids, the rear wheel is deprived of its power.

All those three patterns described above share the common flaw that once either wheel set skids, the other wheel set loses its power. If an additional anti-skid damper is mounted, it means more lose of power, accelerated temperature rise to the mechanical parts, and significant drop of power performance to result in:

(1) In case of bumpy road condition, the rear wheels are prevented from engaging in asynchronous drive with the front wheels, for example, under circumstances when the rear wheels must run faster than the front wheel do.

(2) In case of climbing a slope, or upon starting up under heavy load, controlling the rear wheels to produce power greater than that by the front wheels fails.

(3) Distribution of power for the front and the rear wheels at random is impossible.

SUMMARY OF THE INVENTION

The primary purpose of the present invention is to provide an energy storage type of dual-drive coupled power distribution system to drive an all wheel driving carrier. Wherein, the revolution output end of a revolution power source drives the front end transmission, thus to drive the front end load though an output end from an intermediate transmission and control interface device. Meanwhile, the output end of the intermediate transmission and control interface device drives one revolution input end of the dual-drive type of electromagnetic coupling device while another revolution output end of the dual-drive type of electromagnetic coupling drive device drives the rear end load. The dual-drive type of electromagnetic coupling device may be in the construction of having both end capable of revolving with both end shafts respectively incorporated to a revolving magnetic field structure and a revolving rotor structure while being subject to the control device to regulate the power distribution between the load at the front end and the load at the rear end.

DETAILED DESCRIPTION OF THE PREFERRED EMBODIMENTS

An energy storage type of dual-drive coupled power distribution system of the present invention adapted to an all wheel driving (AWD) transportation means is essentially comprised of a revolution output end from an internal combustion engine (or any other revolving power source) that delivers revolving kinetics to drive front-end load through a front-end transmission by means of an intermediate transmission providing gear-changing or clutching function and a control interface device or coupling device, and to couple to revolution input end of a revolving kinetics driven dual-drive type of electromagnetic coupling device, and further to drive rear-end load through the other revolution output end of the dual-drive type of electromagnetic coupling device. The dual-drive type of electromagnetic coupling device may be made in the construction of a revolving dual-end shaft with both end shafts respectively incorporated to a revolving magnetic filed structure and a revolving rotor structure while being subject to the manipulation by a control device. The dual-drive type of electromagnetic coupling device provides all or a part of the following functions: (1) electric energy from a rechargeable device drives the dual-drive type of electromagnetic coupling device to function as a motor for revolving together with the engine to drive the load, or to function as a motor to revolve clockwise or counter-clockwise in regulating the power distribution for the loads respectively at the front end and the rear end; or (2) to produce generator function to charge the rechargeable device by taking advantage of the rpm difference between the revolving magnetic field structure and the revolving rotor structure of the dual-drive type of electromagnetic coupled drive device, and further to control the size of the differential coupling torque by regulating the charging amperage for regulating the coupling function of rpm difference, and thus the torque distribution between loads respectively at the front end and the rear end; or (3) electric energy from the rechargeable device drives the dual-drive type of electromagnetic coupling drive device to independently engage in revolution for transmission of output to drive the load; or (4) in down slope, exercising a brake or braking for deceleration, the dual-drive type of electromagnetic coupling drive device functions as a generator to charge the rechargeable device or supply power to other power driven load for executing the braking by regenerated power; or (5) the system drives only the front wheels; or (6) the system drives only the rear wheels.

Figure 1:
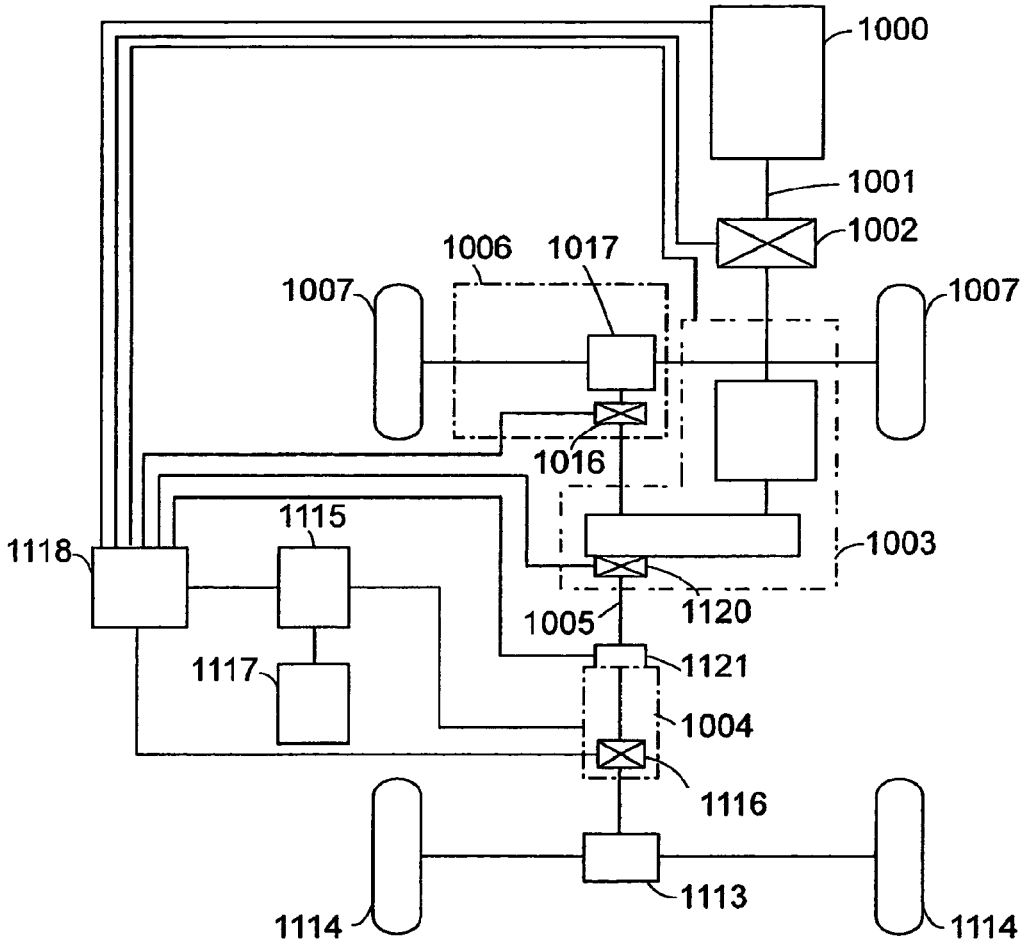
FIG. 1 is a schematic view of a preferred embodiment of the present invention.
Figure 2:
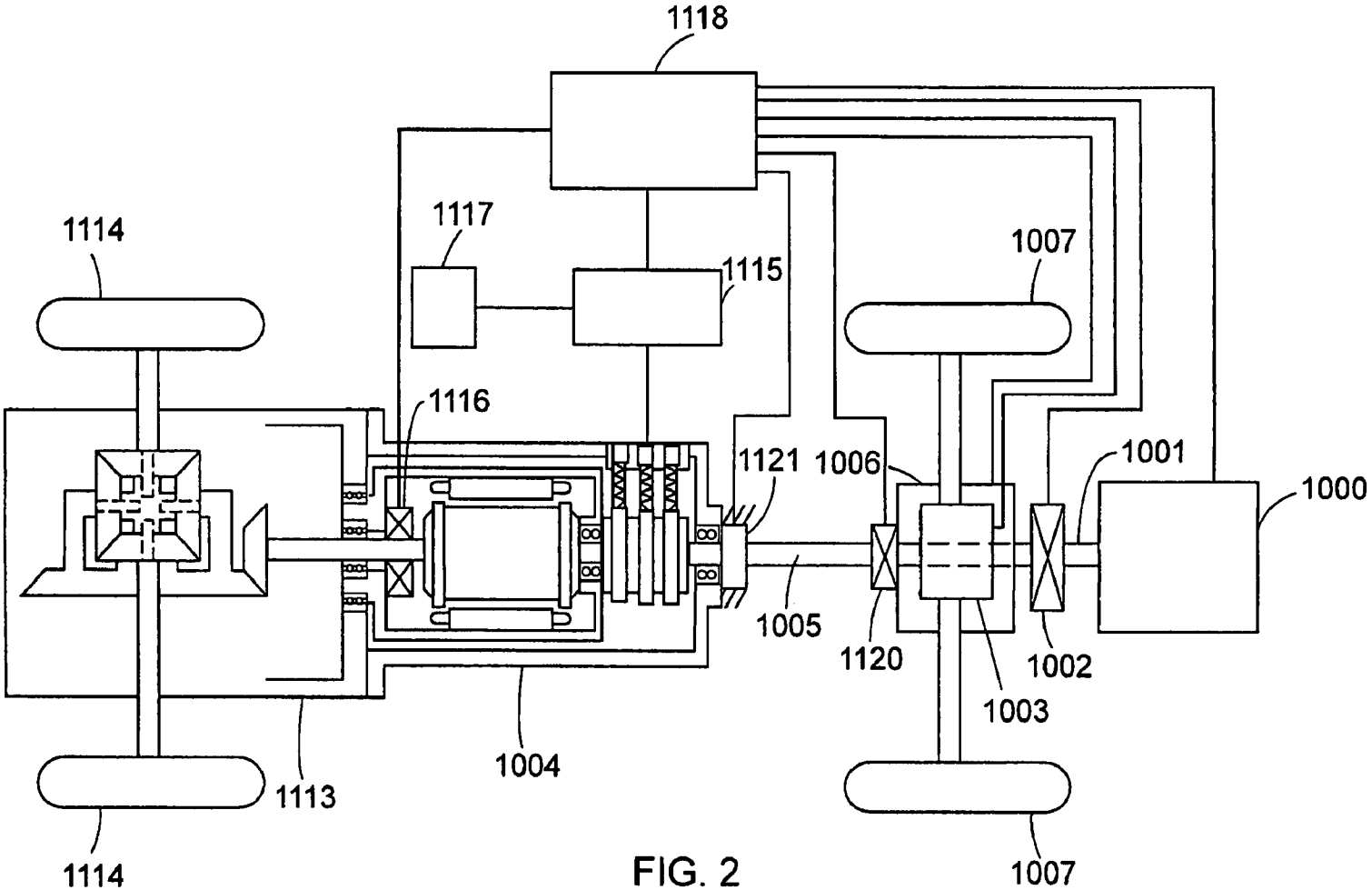
FIG. 2 is a schematic view showing a construction of a cut-away from FIG. 1 of the preferred embodiment of the present invention.

Referring to FIGS. 1, and 2 respectively for a schematic view of a preferred embodiment of the present invention and a schematic view showing a construction of a cut-away from FIG. 1, a preferred embodiment of the present invention is essentially comprised of:

a revolution power unit 1000: comprised of an internal combustion engine or other revolution power source, a revolution output shaft 1001, an optional clutch 1002 or an intermediate transmission and control interface device 1003 that provides gearshift function to drive a front-end load 1007, and an input end of a dual-drive type of electromagnetic coupling drive device 1004 to drive the rear-end load;

the clutch 1002: related to an optional clutch device driven by manual, mechanical, electromagnetic or eccentric force, or comprised of a one-way transmission; disposed at where between the revolution power unit 1000 and the intermediate transmission and control interface device 1003 and subject to the manipulation by a central controller 1118 to execute engagement or disengagement operation;

the intermediate transmission and control interface device 1003: comprised of a conventional man-machine operation interface device including an automatic transmission or manual transmission or manually controlled automatic gearshift device and a clutch; its input end receives the input of revolving kinetics from the revolution power unit 1000 and one of its output end drives a front-end transmission 1006 to further drive a front-end load 1007;

Another output end of the intermediate transmission and control interface device 1003 is provided for driving the dual-drive type of electromagnetic coupling drive device 1004, and the output end of the dual-drive type of electromagnetic coupling drive device 1004 drives a read-end load 1114;

the front-end transmission 1006: an optional device disposed depending on the nature of the load, including an optional differential wheel set 1017 to drive the differential loads at both output ends; or as required, a controllable clutch 1016 is provided to transmit or cut off the revolving kinetics delivered to the front end;

the clutch 1016: related to an optional clutch driven by manual, mechanical, electromagnetic, fluid, or eccentric force, or to a one-way transmission; disposed at where between the revolving kinetics output end of the intermediate transmission and control interface device 1003 and the differential wheel set 1017 subject to the control by the central controller 1118 for the intermediate transmission and control interface device 1003 to engage with or disengage from the differential wheel set 1017;

the dual-drive type of electromagnetic coupling drive device 1004: related to a DC or AC, brush or brush-less revolution electromechanical structure to engage in dual-drive operation including a revolving magnetic field and a revolving rotor respectively coupled to the output end of the intermediate transmission and control interface device 1003 to drive the rear-end load 1114 or other load through a rear-end transmission 1113;

the rear-end transmission 1113: an optional transmission disposed depending on the nature of the load, including an optional differential wheel set, or transmission wheel set to drive single load;

the clutch 1116: related to an optional clutch driven by manual, mechanical, electromagnetic, fluid, or eccentric force, or to a one-way transmission; disposed at where between the revolving magnetic field and the revolving rotor subject to the control by the central controller 1118 for the revolving magnetic field to engage with or disengage from the, revolving rotor;

a clutch 1120: related to an optional clutch driven by manual, mechanical, electromagnetic, fluid, or eccentric force, or to a one-way transmission; disposed at where between the revolving kinetics output end of the intermediate transmission and control interface device 1003 and the an input shaft 1005 of the dual-drive type of electromagnetic coupling drive device 1004 subject to the control by the central controller 1118 for the intermediate transmission on and control interface device 1003 to engage with or disengage from the dual-drive type of electromagnetic coupling drive device 1004;

a brake 1121: related to an optional braking device with its braking function controllable by manual, mechanical, electromagnetic, or fluid force; disposed at where between the input shaft 1005 of the dual-drive type of electromagnetic coupling drive device 1004 to close or release subject to the control by the central controller 1118;

a drive circuit device 1115: related to a dynamo-electric or solid status electronic device; disposed at where between the dual-drive type of electromagnetic coupling drive device 1004 and the rechargeable device 1117 to operate according to the command given by the central controller 1118 to drive the dual-drive type of electromagnetic coupling drive device to function as a motor to revolve clockwise or counter-clockwise, or to execute regulation of input our output voltage and amperage thus to control the dual-drive type of electromagnetic coupling drive device 1004 to operate as a generator for charging the rechargeable device 1117 or outputting the power to other load while controlling the size of the amperage and voltage outputted to control the coupling torque for the dual-drive operation of the dual-drive type of electromagnetic coupling drive device 1004;

the central controller 1118: related to a dynamo-electric or solid status electronic device for outputting control commands to operate the drive circuit device 1115;

the rechargeable device 1117: related to a rechargeable secondary battery, capacitor, or super-capacitor;

the front-end load 1007: related to a or a plurality of wheel set, track or other load driven through the intermediate transmission and control interface device 1003 or further driven by the front-end transmission 1006; and the rear-end load 1114: related to a or a plurality of wheel set, track or other load directly driven, or driven through a transmission or a differential wheel set 1113.

Revolving kinetics outputted from the revolving power unit 1000 in the energy storage type of dual-drive coupled power distribution system of the present invention drives the front-end transmission 1006 through the output end of the intermediate transmission and control interface device 1003 to further drive the front-end load 1007; and has another output end of the intermediate transmission and control interface device 1003 coupled to the input end of the dual-drive type of electromagnetic coupling drive device 1004 to drive the rear-end load 1114 through the output end of the dual-drive type of electromagnetic coupling drive device 1004. The transmission between the output end of the dual-drive type of electromagnetic coupling drive device 1004 to the rear-end load 1114 includes direct transmission to the rear-end load 1114 or indirectly through a transmission provided with gearshift or clutch function; or the rear-end load 1114 with differential need is driven through the differential wheel set 1113.

The energy storage type of dual-drive coupled power distribution system of the present invention when applied in an All Wheel Driving carrier provides all or a part of the following functions through the operation of the intermediate transmission and control interface device 1003 and the control by the central controller 1118: (1) the power supplied from the rechargeable device 1117 drives the dual-drive type of electromagnetic coupling device to function as a motor to drive the load by revolution together with the engine, or to revolve clockwise or counter-clockwise as a motor to regulate the power distribution between the front-end and the rear-end loads; or (2) when the engine provides the drive of the primary power, both of the brake 1121 and the clutch 1116 are in disengaged status; by having the revolving magnetic field coupled to the output end of the intermediate transmission and control interface device 1003 through the clutch 1120, and having the revolving rotor coupled to the differential wheel set 1113 that drives the rear-end load 1114, the rpm difference between the revolving magnetic field and the revolving rotor of the dual-drive type of electromagnetic coupling drive device 1004 provides the function of a generator to charge the rechargeable device 1117 while controlling the size of the charging amperage to further control the size of the differential coupling torque for regulating the power distribution between the loads from the front end the rear end; or (3) with the clutch 1120 disengaged and the brake 1121 closed, the dual-drive type of electromagnetic coupling drive device 1004 is driven by the power supplied from the rechargeable device 1117 subject to the control by the drive circuit device 1115 to separately execute the revolving output to drive the load; or (4) in the event that the carrier is driving down a slope, executing a brake, or an deceleration brake with the clutch 1120 disengaged and the brake 1121 closed, the dual-drive type of electromagnetic coupling drive device 1004 functioning as a generator to charge the rechargeable device 1117 or supply power to other load for executing a brake with regenerated power, or (5) with the clutch 1120 disengaged and the clutch 1016 closed, the revolving kinetics from the revolving power unit 1000 drive the front wheels; or (6) with the clutch 1016 disengaged, the clutches 1120 and 1166 incorporated, the revolving kinetics from the revolving power unit 1000 drive the rear wheels.

When applied in driving the carrier as described above, the front-end load may be related to front wheels or rear wheels; and the rear-end load may be related to any front wheel or rear wheel adapted in compliance with the definition of the front-end load.

In field application, the energy storage type of dual-drive coupled power distribution system of the present invention drives both of the front and the rear wheel sets at the same time, or may only drive the front wheel set or the rear wheel set. Wherein:

the front wheel set includes one or a plurality of circular wheel, or any revolving wheel in a given geometric shape;

the rear wheel set includes one or a plurality of circular wheel, or any revolving wheel in a given geometric shape; and said wheel set described above includes a track structure.

Within the system of the present invention, clutches 1002, 1016, 1116 and 1120, and the brake 1121 are all optional devices and the operating functions of the system are relatively increased or decreased. The inference of the increased or decreased functions is well known to those who are familiar with the art of the AWD, and thus will not be elaborated herein.

In conclusion, the energy storage type of dual-drive coupled power distribution system of the present invention may be applied in a vehicle, sea vessel or any other AWD carrier with fixed type of compound drive power. In field applications, peripherals for the output may be selected as applicable to give more flexibility in choosing the system required.

The invention claimed is:

1. A power distribution system for distributing revolving power in real time to drive a transportation vehicle, comprising:

a power source for providing the revolving power;

a dual-drive electromagnetic coupling device for regulating a distribution of power between a front-end load and a rear-end load of the vehicle, and for outputting power to drive the rear-end load, wherein the dual-drive electromagnetic coupling device comprises a revolving dual-end shaft with one end incorporated to a revolving magnetic field and the other end incorporated to a revolving rotor, wherein when the revolving dual-end shaft is driven by a revolutions-per-minute (RPM) difference of the front-end and rear-end loads the dual-drive electromagnetic coupling device functions as a generator to charge a rechargeable device and provides a passive regulation of the distribution of power, and when the revolving dual-end shaft is powered by the rechargeable device, the dual-drive electromagnetic coupling device functions as a motor so that the revolving dual-end shaft revolves clockwise or counter-clockwise to provide an active regulation of the distribution of power; and a transmission and control interface device for transmitting the revolving power to the front-end load and the dual-drive electromagnetic coupling device.

2. A power distribution system for distributing revolving power in real time to drive a transportation vehicle, comprising:

a power source for providing the revolving power;

a dual-drive electromagnetic coupling device for regulating a distribution of power between a front-end load and a rear-end load of the vehicle, and for outputting power to drive the rear-end load, wherein the dual-drive electromagnetic coupling device comprises a revolving dual-end shaft with one end incorporated to a revolving magnetic field and the other end incorporated to a revolving rotor, wherein when the revolving dual-end shaft is driven by a revolutions-per-minute (RPM) difference of the front-end and rear-end loads the dual-drive electromagnetic coupling device functions as a generator to charge a rechargeable device and provides a passive regulation of the distribution of power; and a transmission and control interface device for transmitting the revolving power to the front-end load and the dual-drive electromagnetic coupling device.

3. The power distribution system of claim 1, wherein the power source is an internal combustion engine.

4. The power distribution system of claim 1, wherein the transmission and control interface device comprises a manual-mechanical operation interface device.

5. The power distribution system of claim 4, wherein the manual-mechanical operation interface device comprises one of an automatic transmission, an manual transmission and a manually controlled automatic gearshift device.

6. The power distribution system of claim 1, further comprising a central controller to control operations of brakes and clutches of the vehicle to enable different working modes of the dual-drive electromagnetic coupling device, and to distribute the revolving power to the front-end and rear-end loads.

7. The power distribution system of claim 1, wherein the front-end load is related to a first set of wheels, and the rear-end load is related to a second set of wheels, and wherein the first and second sets of wheels are one of the front wheels, rear wheels and a combination of front and rear wheels.

8. The power distribution system of claim 1, wherein the front-end and the rear-end loads comprise a wheel of a selected geometric shape.

9. The power distribution system of claim 8, wherein the wheel is configured to ride on a track structure.

*10. A power distribution system for distributing revolving power in real time to drive a transportation vehicle, comprising:*

*a power source for providing the revolving power; and*

*a dual-drive electromagnetic coupling device for regulating a distribution of power between a front-end load and a rear-end load of the vehicle, and for outputting power to drive the rear-end load, the dual-drive electromagnetic coupling device including a revolving dual-end shaft with one end incorporated to a revolving magnetic field and the other end incorporated to a revolving rotor, and a clutch disposed between the revolving magnetic field and the revolving rotor for engaging or disengaging the revolving magnetic field with the revolving rotor, wherein*

*when the revolving dual-end shaft is driven by a revolutions-per-minute (RPM) difference of the front-end and rear-end loads, the dual-drive electromagnetic coupling device functions as a generator to charge a rechargeable device and provides a passive regulation of the distribution of power, and*

*when the revolving dual-end shaft is powered by the rechargeable device, the dual-drive electromagnetic coupling device functions as a motor so that the revolving dual-end shaft revolves clockwise or counter-clockwise to provide an active regulation of the distribution of power.*

*11. The power distribution system of claim 10, further comprising a transmission and control interface device for transmitting the revolving power to the front-end load and the dual-drive electromagnetic coupling device.*

*12. The power distribution system of claim 11, wherein the transmission and control interface device comprises a manual-mechanical operation interface device.*

*13. The power distribution system of claim 12, wherein the manual-mechanical operation interface device comprises one of an automatic transmission, a manual transmission and a manually controlled automatic gearshift device.*

*14. The power distribution system of claim 10, wherein the power source is an internal combustion engine.*

*15. The power distribution system of claim 10, further comprising a central controller to control operations of brakes and clutches of the vehicle to enable different working modes of the dual-drive electromagnetic coupling device, and to distribute the revolving power to the front-end and rear-end loads.*

*16. The power distribution system of claim 10, wherein the front-end load is related to a first set of wheels, and the rear-end load is related to a second set of wheels, and wherein the first and second sets of wheels are one of the front wheels, rear wheels and a combination of front and rear wheels.*

*17. The power distribution system of claim 10, wherein the front-end and the rear-end loads comprise a wheel of a selected geometric shape.*

*18. A power distribution system for distributing revolving power in real time to drive a transportation vehicle, comprising:*

*a power source for providing the revolving power; and*

*a dual-drive electromagnetic coupling device for regulating a distribution of power between a front-end load and a rear-end load of the vehicle, and for outputting power to drive the rear-end load, the dual-drive electromagnetic coupling device including a revolving dual-end shaft with one end incorporated to a revolving magnetic field and the other end incorporated to a revolving rotor, and a clutch disposed between the revolving magnetic field and the revolving rotor for engaging or disengaging the revolving magnetic field with the revolving rotor, wherein*

*when the revolving dual-end shaft is driven by a revolutions-per-minute (RPM) difference of the front-end and rear-end loads, the dual-drive electromagnetic coupling device functions as a generator to charge a rechargeable device and provides a passive regulation of the distribution of power,*

*further comprising a transmission and control interface device for transmitting the revolving power to the front-end load and the dual-drive electromagnetic coupling device.*

* * * * *